US012578567B2

(12) United States Patent
Ramamoorthy et al.

(10) Patent No.: US 12,578,567 B2
(45) Date of Patent: **\*Mar. 17, 2026**

(54) APPARATUS AND METHODS FOR REAL-TIME IMAGE GENERATION

(71) Applicant: Pramana, Inc., Cambridge, MA (US)

(72) Inventors: Ganesh Ramamoorthy, Andover, MA (US); Prasanth Perugupalli, Cary, NC (US)

(73) Assignee: Pramana, Inc., Cambridge, MA (US)

( \* ) Notice: Subject to any disclaimer, the term of this patent is extended or adjusted under 35 U.S.C. 154(b) by 37 days.

This patent is subject to a terminal disclaimer.

(21) Appl. No.: 18/598,307

(22) Filed: Mar. 7, 2024

(65) Prior Publication Data

US 2025/0035907 A1 Jan. 30, 2025

Related U.S. Application Data

(63) Continuation of application No. 18/226,100, filed on Jul. 25, 2023, now Pat. No. 11,947,099.

(51) Int. Cl.
| | |
|---|---|
| *G02B 21/36* | (2006.01) |
| *G02B 21/26* | (2006.01) |
| *G02B 21/32* | (2006.01) |
| *G02B 21/34* | (2006.01) |

(52) U.S. Cl.
CPC .......... *G02B 21/361* (2013.01); *G02B 21/26* (2013.01); *G02B 21/32* (2013.01); *G02B 21/34* (2013.01); *G02B 21/365* (2013.01); *G02B 21/368* (2013.01)

(58) Field of Classification Search
CPC ...... G02B 21/361; G02B 21/26; G02B 21/32; G02B 21/34; G02B 21/365; G02B 21/368

USPC .............................................. 348/79; 359/368
See application file for complete search history.

(56) References Cited

U.S. PATENT DOCUMENTS

| | | | |
|---|---|---|---|
| 9,014,480 B2 | 4/2015 | Baheti et al. | |
| 9,342,741 B2 | 5/2016 | Amtrup et al. | |
| 11,430,202 B2 | 8/2022 | Whitestone et al. | |
| 11,636,627 B2 | 4/2023 | Siegel et al. | |
| 11,947,099 B1 * | 4/2024 | Ramamoorthy | G02B 21/32 |
| 2011/0164314 A1 * | 7/2011 | Shirota | G06F 3/0481 |
| | | | 359/368 |
| 2011/0242308 A1 * | 10/2011 | Igarashi | G02B 21/16 |
| | | | 348/79 |

(Continued)

OTHER PUBLICATIONS

Manzo et al; Whole Slide Scanning Solution For Pathology Glass Slides of Challenging Variable Quality; Date: Unknown.

(Continued)

*Primary Examiner* — Jayanti K Patel
*Assistant Examiner* — Richard B Carter
(74) *Attorney, Agent, or Firm* — CALDWELL LLC

(57) ABSTRACT

Aspects of present disclosure relate to real-time image generation. An exemplary apparatus for real time image generation includes at least an optical system, a slide port configured to hold a slide, an actuator mechanism mechanically connected to a mobile element, a user interface comprising an input interface and an output interface, at least a processor configured to: using the at least an optical system, capture a first image of the slide at a first position, modify the first image, using the output interface, display the first image to a user, using the input interface, receive a parameter set from the user.

20 Claims, 8 Drawing Sheets

(56)     References Cited

U.S. PATENT DOCUMENTS

| | | |
|---|---|---|
| 2012/0127297 A1 | 5/2012 | Baxi et al. |
| 2013/0027539 A1* | 1/2013 | Kiyota ................... C12M 41/36 |
| | | 348/79 |
| 2013/0076888 A1 | 3/2013 | Hibino et al. |
| 2021/0151287 A1 | 5/2021 | Hyde et al. |
| 2022/0179187 A1 | 6/2022 | Harfouche et al. |
| 2023/0143800 A1 | 5/2023 | Casas |
| 2024/0028831 A1 | 1/2024 | Jain et al. |

OTHER PUBLICATIONS

Icaro et al., General Self-aware Information Extraction from Labels of Biological Collections; Date May 2020.

* cited by examiner

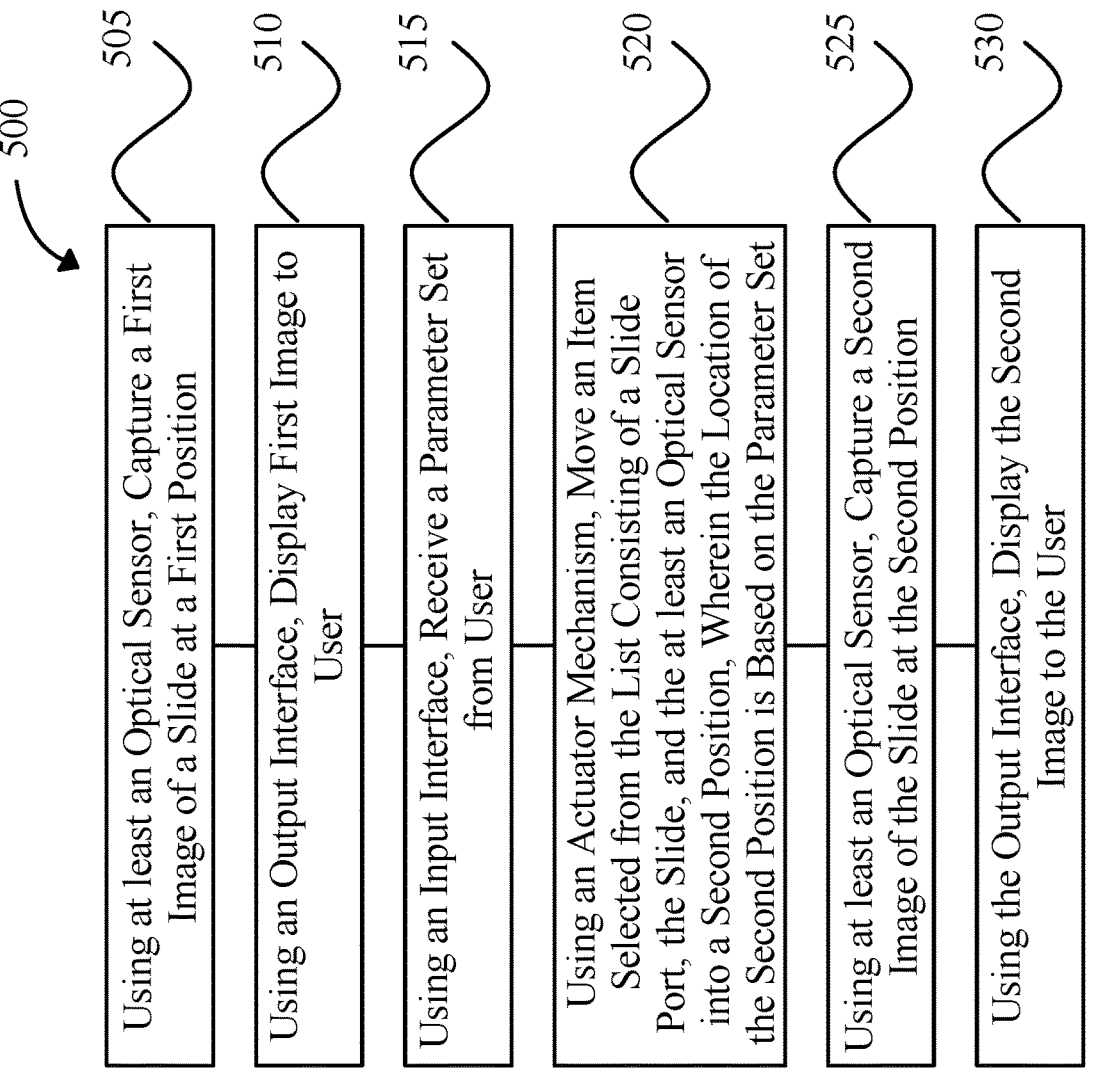

500

505 Using at least an Optical Sensor, Capture a First Image of a Slide at a First Position 510 Using an Output Interface, Display First Image to User 515 Using an Input Interface, Receive a Parameter Set from User 520 Using an Actuator Mechanism, Move an Item Selected from the List Consisting of a Slide Port, the Slide, and the at least an Optical Sensor into a Second Position, Wherein the Location of the Second Position is Based on the Parameter Set 525 Using at least an Optical Sensor, Capture a Second Image of the Slide at the Second Position 530 Using the Output Interface, Display the Second Image to the User

FIG. 5

APPARATUS AND METHODS FOR REAL-TIME IMAGE GENERATION

CROSS-REFERENCE TO RELATED APPLICATIONS

This application is a continuation of Non-provisional application Ser. No. 18/226,100 filed on Jul. 25, 2023, and entitled "APPARATUS AND METHODS FOR REAL-TIME IMAGE GENERATION," the entirety of which is incorporated herein by reference.

FIELD OF THE INVENTION

The present invention generally relates to the field of real-time image generation. In particular, the present invention is directed to apparatus and methods for real-time image generation.

BACKGROUND

Intraoperative diagnostic assessment of tissue is of immense value and several methods have been developed to address the 12-48 hour time-lapse for obtaining high-quality formalin-fixed paraffin-embedded (FFPE) tissue. Recent AI-enabled methods reduce this wait time to minutes making it potentially possible for intraoperative use. However, these approaches still have deficiencies that need to be addressed. For one, they still require a scanning step that digitizes the image followed by a generation step which is then followed by a human expert visually examining the digitized slide. Additionally, they need to rescan the frozen section if the separate digitization process is performed on an image at a suboptimal focal length.

SUMMARY OF THE DISCLOSURE

In an aspect, an exemplary apparatus for real time image generation includes at least an optical system is disclosed. The apparatus includes at least an optical system. The apparatus includes a slide port configured to hold a slide. The apparatus includes an actuator mechanism mechanically connected to a mobile element. The apparatus includes a user interface. The apparatus includes at least a processor. The apparatus includes a memory communicatively connected to the at least a processor. The memory contains instructions configuring the at least a processor to capture a first image of the slide at a first position using the at least an optical system. The memory contains instructions configuring the at least a processor to receive a first parameter set. The memory contains instructions configuring the at least a processor to move the mobile element into a second position, wherein the second position is determined based on the parameter set using the actuator mechanism. The memory contains instructions configuring the at least a processor to capture a second image of the slide at the second position using the at least an optical system. The memory contains instructions configuring the at least a processor to display the second image of the slide to a user.

In another aspect, a method for real time image generation is disclosed. The method includes capturing, using at least a processor and at least an optical system, a first image of the slide at a first position. The method includes receiving, by the at least a processor, a first parameter set. The method includes removing, by the at least a processor, a at least an artifact from the first image, wherein removing the at least an artifact comprises. The method includes receiving the first image by an artifact removal machine learning model, wherein the artifact removal machine learning model comprises a generative machine learning model. The method includes removing the at least an artifact from the first image using the artifact removal machine learning model. The method includes moving, by the at least a processor, a mobile element into a second position, wherein the second position is determined based on the first parameter set using an actuator mechanism. The method includes capturing, by the at least a processor, a second image of the slide at the second position using at least an optical system. The method includes displaying, by the at least a processor, the second image to a user.

In an aspect, an exemplary apparatus for real time image generation includes at least an optical system is disclosed. The apparatus includes at least an optical system. The apparatus includes a slide port configured to hold a slide. The apparatus includes an actuator mechanism mechanically connected to a mobile element. The apparatus includes a user interface. The apparatus includes at least a processor. The apparatus includes a memory communicatively connected to the at least a processor. The memory contains instructions configuring the at least a processor to capture a first image of the slide at a first position using the at least an optical system. The memory contains instructions configuring the at least a processor to receive a first parameter set. The memory contains instructions configuring the at least a processor to move the mobile element into a second position, wherein the second position is determined based on the parameter set using the actuator mechanism. The memory contains instructions configuring the at least a processor to capture a second image of the slide at the second position using the at least an optical system. The memory contains instructions configuring the at least a processor to generate a hybrid image by replacing at least a region of the first image with the second image using the at least an optical system. Generating the hybrid image includes identifying at least an artifact within the first image. Generating the hybrid image includes removing the at least an artifact from the hybrid image. Removing the at least an artifact includes receiving the first image by an artifact removal machine learning model, wherein the artifact removal machine learning model comprises a generative machine learning model. Removing the at least an artifact includes removing the at least an artifact from the hybrid image using the artifact removal machine learning model. The memory contains instructions configuring the at least a processor to display the hybrid image to the user using the user interface.

In another aspect, a method for real time image generation is disclosed. The method includes capturing, using at least a processor and at least an optical system, a first image of the slide at a first position. The method includes receiving, by the at least a processor, a first parameter set. The method includes removing, by the at least a processor, a at least an artifact from the first image, wherein removing the at least an artifact comprises. The method includes receiving the first image by an artifact removal machine learning model, wherein the artifact removal machine learning model comprises a generative machine learning model. The method includes removing the at least an artifact from the first image using the artifact removal machine learning model. The method includes moving, by the at least a processor, a mobile element into a second position, wherein the second position is determined based on the first parameter set using an actuator mechanism. The method includes capturing, by the at least a processor, a second image of the slide at the second position using at least an optical system. The method includes generating, by the at least a processor, a hybrid image by replacing at least a region of interest of the first image with the second image to create a hybrid image using the at least an optical system. Generating the hybrid image includes identifying at least an artifact within the first image. Generating the hybrid image includes removing the at least an artifact from the hybrid image. Removing the at least an artifact includes receiving the first image by an artifact removal machine learning model, wherein the artifact removal machine learning model comprises a generative machine learning model. Removing the at least an artifact includes removing the first artifact from the hybrid image using the artifact removal machine learning model. The method includes displaying, by the at least a processor, the hybrid image to the user using the user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a diagram depicting an exemplary method of real-time image generation;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for real time image generation. Apparatus described herein may generate images of slides 116 and/or samples on slides. In an embodiment, said apparatus may generate a plurality of images, make adjustments to the plurality of images, and display plurality of images to a user in real time as the user manipulates an input interface 128. Exemplary embodiments illustrating aspects of the present disclosure are described below in the context of several specific examples.

Figure 1:
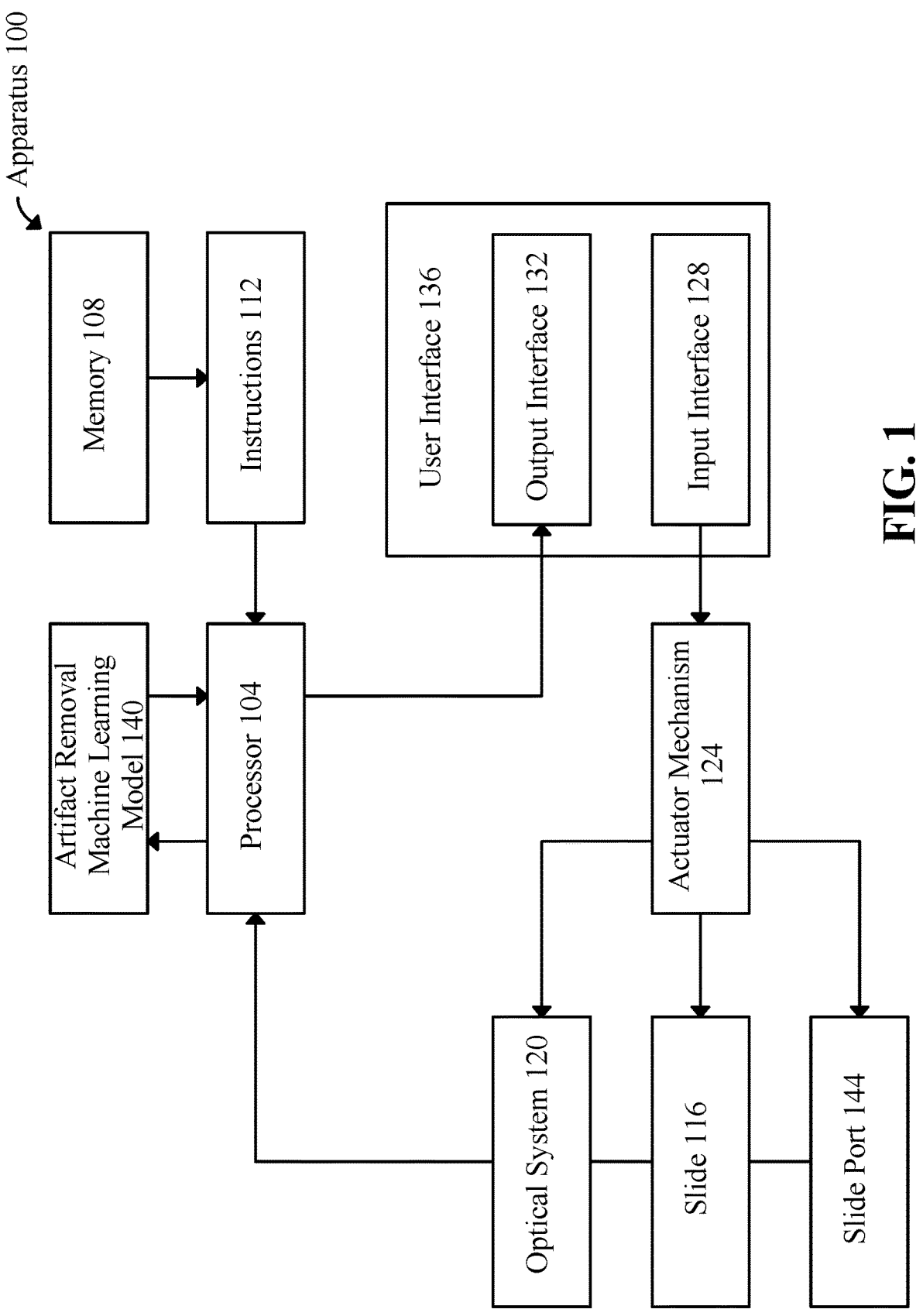
FIG. 1 is a diagram depicting an exemplary apparatus for real-time image generation.

Referring now to FIG. 1, an exemplary embodiment of an apparatus 100 for real time image generation is illustrated. Apparatus 100 may include a computing device. Apparatus 100 may include a processor 104. Processor 104 may include, without limitation, any processor 104 described in this disclosure. Processor 104 may be included in a computing device. Apparatus 100 may include at least a processor 104 and a memory 108 communicatively connected to the at least a processor 104, the memory 108 containing instructions 112 configuring the at least a processor 104 to perform one or more processes described herein. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, cither directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may be used to generate an image of slide 116 and/or a sample on slide 116. As used herein, a "slide" is a container or surface holding a sample of interest. In some embodiments, slide 116 may include a glass slide. In some embodiments, slide 116 may include a formalin fixed paraffin embedded slide. In some embodiments, a sample on slide 116 may be stained. In some embodiments, slide 116 may be substantially transparent. In some embodiments, slide 116 may include a thin, flat, and substantially transparent glass slide. In some embodiments, a transparent cover may be applied to slide 116 such that a sample is between slide 116 and this cover. In some embodiments, a sample on slide 116 may include a tissue sample. In some embodiments, sample on slide 116 may be frozen.

Still referring to FIG. 1, in some embodiments, slide 116 and/or a sample on slide 116 may be illuminated. In some embodiments, apparatus 100 may include a light source. As used herein, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide 116 and/or sample on slide 116. In a non-limiting example, light source may illuminate slide 116 and/or sample on slide 116 from below.

Still referring to FIG. 1, in some embodiments, apparatus 100 may include at least an optical system 120. As used in this disclosure, an "optical system" is an arrangement of one or more components which together act upon or employ electromagnetic radiation, such as light (e.g., visible light, infrared light, UV light, or the like). An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. As used herein, an "optical sensor" is a device that measures light and converts the measured light into one or more signals; one or more signals may include, without limitation, one or more electrical signals. In some embodiments, optical sensor 120 may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor 120 may include a plurality of photodetectors. Optical sensor 120 may include, without limitation, a camera. Optical sensor 120 may be in electronic communication with at least a processor 104 of apparatus 100. As used herein, "electronic communication" as used in this disclosure is a shared data connection between two or more devices. In some embodiments, apparatus 100 may include two or more optical sensors 120.

Still referring to FIG. 1, in some embodiments, optical system 120 may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide 116. In some embodiments, one or more of such settings may be configured based on a parameter set, as described below. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infra-red.

Still referring to FIG. 1, as used herein, "image data" is information representing at least a physical scene, space, and/or object. Image data may include, for example, information representing a sample, slide 116, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1, in some embodiments, apparatus 100 may include a slide port 144. In some embodiments, slide port 144 may be configured to hold slide 116. In some embodiments, slide port 144 may include one or more alignment features. As used herein, an "alignment feature" is a physical feature that helps to secure a slide in place and/or align a slide with another component of an apparatus. In some embodiments, alignment feature may include a component which keeps slide 116 secure, such as a clamp, latch, clip, recessed area, or another fastener. In some embodiments, slide port 144 may allow for easy removal or insertion of slide 116. In some embodiments, slide port 144 may include a transparent surface through which light may travel. In some embodiments, slide 116 may rest on and/or may be illuminated by light traveling through such a transparent surface. In some embodiments, slide port 144 may be mechanically connected to an actuator mechanism 124 as described below.

Still referring to FIG. 1, in some embodiments, apparatus 100 may include an actuator mechanism 124. As used herein, an "actuator mechanism" is a mechanical component configured to change the relative position of a slide and an optical system. In some embodiments, actuator mechanism 124 may be mechanically connected to slide 116, such as slide 116 in slide port 144. In some embodiments, actuator mechanism 124 may be mechanically connected to slide port 144. For example, actuator mechanism 124 may move slide port 144 in order to move slide 116. In some embodiments, actuator mechanism 124 may be mechanically connected to at least an optical system 120. In some embodiments, actuator mechanism 124 may be mechanically connected to a mobile element. As used herein, a "mobile element" refers to any movable or portable object, component, and device within apparatus 100 such as, without limitation, a slide, a slide port, or an optical system. In some embodiments, a mobile element may move such that optical system 120 is positioned correctly with respect to slide 116 such that optical system 120 may capture an image of slide 116 according to a parameter set. In some embodiments, actuator mechanism 124 may be mechanically connected to an item selected from the list consisting of slide port 144, slide 116, and at least an optical system 120. In some embodiments, actuator mechanism 124 may be configured to change the relative position of slide 116 and optical system 120 by moving slide port 144, slide 116, and/or optical system 120.

Still referring to FIG. 1, actuator mechanism 124 may include a component of a machine that is responsible for moving and/or controlling a mechanism or system. Actuator mechanism 124 may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism 124 responds by converting source power into mechanical motion. In some cases, actuator mechanism 124 may be understood as a form of automation or automatic control.

Still referring to FIG. 1, in some embodiments, actuator mechanism 124 may include a hydraulic actuator. A hydraulic actuator may consist of a cylinder or fluid motor that uses hydraulic power to facilitate mechanical operation. Output of hydraulic actuator mechanism 124 may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator mechanism 124 may include a pneumatic actuator mechanism 124. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism 124 may include an electric actuator. Electric actuator mechanism 124 may include any of electromechanical actuators, linear motors, and the like. In some cases, actuator mechanism 124 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 124 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism 124 may include a mechanical actuator mechanism 124. In some cases, a mechanical actuator mechanism 124 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some embodiments, actuator mechanism 124 may be in electronic communication with actuator controls. As used herein, "actuator controls" is a system configured to operate actuator mechanism such that a slide and an optical system reach a desired relative position. In some embodiments, actuator controls may operate actuator mechanism 124 based on input received from a user interface 136. In some embodiments, actuator controls may be configured to operate actuator mechanism 124 such that optical system 120 is in a position to capture an image of an entire sample. In some embodiments, actuator controls may be configured to operate actuator mechanism 124 such that optical system 120 is in a position to capture an image of a region of interest. As used in this disclosure, a "region of interest" is a specific area within a digital image, or a specific area within a slide. In some embodiments, a region of interest may include a region selected by a user or navigated to by a user. Electronic communication between actuator mechanism 124 and actuator controls may include transmission of signals. For example, actuator controls may generate physical movements of actuator mechanism in response to an input signal. In some embodiments, input signal may be received by actuator controls from processor 104 or input interface 128.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some embodiments, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, in some embodiments, apparatus 100 may include a user interface 136. User interface 136 may include output interface 132 and input interface 128.

Still referring to FIG. 1, in some embodiments, output interface 132 may include one or more elements through which apparatus 100 may communicate information to a user. In a non-limiting example, output interface 132 may include a display. A display may include a high resolution display. A display may output images, videos, and the like to a user. In another non-limiting example, output interface 132 may include a speaker. A speaker may output audio to a user.

In another non-limiting example, output interface 132 may include a haptic device. A speaker may output haptic feedback to a user.

Still referring to FIG. 1, in some embodiments, input interface 128 may include controls for operating apparatus 100. Such controls may be operated by a user. Input interface 128 may include, in non-limiting examples, a camera, microphone, keyboard, touch screen, mouse, joystick, foot pedal, button, dial, and the like. Input interface 128 may accept, in non-limiting examples, mechanical input, audio input, visual input, text input, and the like. In some embodiments, audio inputs into input interface 128 may be interpreted using an automatic speech recognition function, allowing a user to control apparatus 100 via speech. In some embodiments, input interface 128 may approximate controls of a microscope.

Still referring to FIG. 1, in some embodiments, audio inputs may be processed using automatic speech recognition. In some embodiments, automatic speech recognition may require training (i.e., enrollment). In some cases, training an automatic speech recognition model may require an individual speaker to read text or isolated vocabulary. In some cases, audio training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within audio inputs, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, apparatus 100 captures a first image of slide 116 at a first position. In some embodiments, first image may be captured using at least an optical system 120.

Still referring to FIG. 1, in some embodiments, capturing a first image of a slide 116 at a first position may include using actuator mechanism 124 and/or actuator controls to move optical system 120 and/or slide 116 into desired positions. In some embodiments, first image includes an image of the entire sample and/or the entire slide 116. In some embodiments, first image includes an image of a region of a sample. In some embodiments, first image includes a wider angle image than second image (described below). In some embodiments, first image includes a lower resolution image than second image.

Still referring to FIG. 1, in some embodiments, a machine vision system and/or an optical character recognition system may be used to determine one or more features of sample and/or slide 116. Such feature determinations may be used to, for example, remove artifacts from images and/or annotate images as described below. In a non-limiting example, an optical character recognition system may be used to identify writing on slide 116, and this may be used to annotate an image of slide 116. In another non-limiting example, a machine vision system may be used to detect dust particles in a slide 116, and an artifact removal machine learning model (described below) may remove the dust particles from the image.

Still referring to FIG. 1, in some embodiments, apparatus 100 may capture a plurality of images of the same X and Y coordinates at differing focus depths. As used herein, a "focus depth" is a depth within a sample that an optical system is in focus. As used herein, a "focus distance" is a distance from optical system at which optical sensor is in focus. In some embodiments, first image and second image may have different focus distances and/or focus depths. In some embodiments, such images may be stored as a plurality of layers of an image. For example, each layer may correspond with a particular focus depth. In some embodiments, a user may be able to navigate between layers using user interface 136. In a non-limiting example, this may be implemented by displaying to a user a focus depth selection menu. In this example, user may select a first focus depth, and an image taken at first focus depth may be displayed. In this example, user may then select a second focus depth, and an image taken at second focus depth may be displayed. In some embodiments, apparatus 100 may capture images at a particular focus depth upon selection of that focus depth by a user.

Still referring to FIG. 1, in some embodiments, apparatus 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, image data may be processed using optical character recognition. In some embodiments, optical character recognition or optical character reader (OCR) includes automatic conversion of images of written (e.g., typed, handwritten or printed text) into machine-encoded text. In some cases, recognition of at least a keyword from image data may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image data. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image data to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image data. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image data.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of image data. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image data. Since the adaptive classifier may have learned something useful a little too late to recognize characters on the first pass, a second pass is run over the image data. Second pass may include adaptive recognition and use characters recognized with high confidence on the first pass to recognize better remaining characters on the second pass. In some cases, two-pass approach may be advantageous for unusual fonts or low-quality image data. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of image data. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, apparatus 100 removes an artifact from an image. As used herein, an "artifact" is a visual inaccuracy, an element of an image that distracts from an element of interest, an element of an image that obscures an element of interest, or another undesirable element of an image.

Still referring to FIG. 1, apparatus 100 may include an image processing module. As used in this disclosure, an "image processing module" is a component designed to process digital images. In an embodiment, image processing module may include a plurality of software algorithms that can analyze, manipulate, or otherwise enhance an image, such as, without limitation, a plurality of image processing techniques as described below. In another embodiment, image processing module may slow include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive images from optical sensor 120. In a non-limiting example, image processing module may be configured to receive images by generating a first image capture parameter, transmitting a command to optical sensor 120 to take first image of a plurality of images with the first image capture parameter, generate a second image capture parameter, transmit a command to optical sensor 120 to take second image of a plurality of images with the second image capture parameter, and receive, from optical sensor 120, first image and second image. In another non-limiting example, plurality of images may be taken by optical sensor 120 using the same image capture parameter. Image capture parameter may be generated as a function of user input.

Still referring to FIG. 1, plurality of images may be transmitted, from optical sensor 120 to image processing module, via any suitable electronic communication protocol, including without limitation packet-based protocols such as transfer control protocol-internet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

Still referring to FIG. 1, image processing module may be configured to process images. In an embodiment, image processing module may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing module may be configured to perform a lossless compression on images, wherein the lossless compression may maintain the original image quality of images. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on plurality of images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

Still referring to FIG. 1, in an embodiment, processing images may include determining a degree of quality of depiction of a region of interest of an image or a plurality of images. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of images.

Still referring to FIG. 1, processing images may include enhancing at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction 128). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

Still referring to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

Still referring to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1, in a non-limiting example, isolating a feature of interest from an image may include determining a feature of interest via edge detection technique. A feature of interest may include a specific area within a digital image that contains information relevant to further processing as described below. In a non-limiting example, an image data located outside a feature of interest may include irrelevant or extraneous information. Such portion of an image containing irrelevant or extraneous information may be disregarded by image processing module, thereby allowing resources to be concentrated at a feature of interest. In some cases, feature of interest may vary in size, shape, and/or location within an image. In a non-limiting example feature of interest may be presented as a circle around the nucleus of a cell. In some cases, feature of interest may specify one or more coordinates, distances and the like, such as center and radius of a circle around the nucleus of a cell in an image. Image processing module may then be configured to isolate feature of interest from the image based on feature of interest. In a non-limiting example, image processing module may crop an image according to a bounding box around a feature of interest.

Still referring to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1, in an embodiment, isolating feature of interest from an image may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

Still referring to FIG. 1, in some embodiments, apparatus 100 may remove an artifact identified by a machine vision system or an optical character recognition system, which are described above. Non-limiting examples of artifacts that may be removed include dust particles, bubbles, cracks in slide 116, writing on slide 116, shadows, visual noise such as in a grainy image, and the like. In some embodiments, an artifact may be partially removed and/or lowered in visibility.

Still referring to FIG. 1, in some embodiments, an artifact may be removed using an artifact removal machine learning model 140. In some embodiments, artifact removal machine learning model 140 may be trained on a dataset including images, associated with images without artifacts. In some embodiments, artifact removal machine learning model 140 may accept as an input an image including an artifact and may output an image without the artifact. For example, artifact removal machine learning model 140 may accept as an input an image including a bubble in a slide and may output an image that does not include the bubble. In some embodiments, artifact removal machine learning model 140 may include a generative machine learning model such as a diffusion model. A diffusion model may learn the structure of a dataset by modeling the way data points diffuse through a latent space. In some embodiments, artifact removal may be done locally. For example, apparatus 100 may include an already trained artifact removal machine learning model and may apply the model to an image. In some embodiments, artifact removal may be done externally. For example, apparatus 100 may transmit image data to another computing device and may receive an image with an artifact removed. In some embodiments, an artifact may be removed in real time. In some embodiments, an artifact may be removed based on identification by a user. For example, a user may drag a box around an artifact using a mouse cursor, and apparatus 100 may remove an artifact in the box.

Still referring to FIG. 1, in some embodiments, apparatus 100 may remove an artifact from first image. In some embodiments, apparatus 100 may remove an artifact from second image. In some embodiments, apparatus 100 may remove an artifact from hybrid image.

Still referring to FIG. 1, in some embodiments, apparatus 100 displays first image to a user. In some embodiments, first image may be displayed to a user in real time. In some embodiments, first image may be displayed to a user using output interface 132. For example, first image may be displayed to a user a display such as a screen. In some embodiments, first image may be displayed to a user in the context of a graphical user interface (GUI). For example, a GUI may include controls for navigating an image such as controls for zooming in or out or changing where is being viewed. A GUI may include a touchscreen.

Still referring to FIG. 1, in some embodiments, apparatus 100 may receive a parameter set from a user. As used herein, a "parameter set" is a set of values that identify how an image is to be captured. A parameter set may be implemented as a data structure as described below. In some embodiments, apparatus 100 may receive a parameter set from a user using input interface 128. A parameter set may include X and Y coordinates indicating where the user wishes to view. A parameter set may include a desired level of zoom. As used herein, a "level of zoom" is a datum describing how zoomed in or out an image is to be captured at. A level of zoom may account for optical zoom and/or digital zoom. As a non-limiting example, a level of zoom may be "8×" zoom. A parameter set may include a desired focus depth. In a non-limiting example, user may manipulate input interface 128 such that a parameter set includes X and Y coordinates and a level of zoom corresponding to a more zoomed in view of a particular region of a sample. In some embodiments, a parameter set corresponds to a more zoomed in view of a particular region of a sample that is included in first image. This may be done, for example, to get a more detailed view of a small object. As used herein, unless indicated otherwise, an "X coordinate" and a "Y coordinate" refer to coordinates along perpendicular axes, where the plane defined by these axes is parallel to a plane of a surface of slide 116. In some cases, setting a zoom may include changing one or more optical elements within optical system. For example, setting a zoom may include replacing a first objective lens for a second objective lens having a different magnification. Additionally or alternative, one or more optical components "down beam" from objective lens may be replaced to change a total magnification of optical system and, thereby, set a zoom. In some cases, setting a zoom may include changing a digital magnification. Digital magnification may include outputting an image, using output interface, at a different resolution, i.e. after re-scaling the image.

Still referring to FIG. 1, in some embodiments, apparatus 100 moves an item selected from the list consisting of slide port 144, slide 116, and at least an optical system 120 into a second position, wherein the location of the second position is based on the parameter set. Second position may be determined by, for example, modifying the position of optical system 120 relative to slide 116 based on parameter set. For example, parameter set may indicate that second position is achieved by modifying an X coordinate by 5 mm in a particular direction. In this example, second position may be found by modifying optical system's original position by 5 mm in that direction. In some embodiments, such movement may be done using actuator mechanism 124. In some embodiments, actuator mechanism 124 may move slide port 144 such that slide 116 is in a position relative to at least an optical system 120 such that optical sensor 120 may capture an image as directed by parameter set. For example, slide 116 may rest on slide port 144 and movement of slide port 144 may move slide 116 as well. In some embodiments, actuator mechanism 124 may move slide 116 such that slide 116 is in a position relative to at least an optical system 120 such that optical sensor 120 may capture an image as directed by parameter set. For example, slide 116 may be connected to actuator mechanism 124 such that actuator mechanism 124 may move slide 116 relative to at least an optical system 120. In some embodiments, actuator mechanism 124 may move at least an optical system 120 such that slide 116 is in a position relative to slide 116 such that optical system 120 may capture an image as directed by parameter set. For example, slide 116 may be stationary, and actuator mechanism 124 may move at least an optical system 120 into position relative to slide 116. In some embodiments, actuator mechanism 124 may move more than one of slide port 144, slide 116, and at least an optical system 120 such that they are in the correct relative positions. In some embodiments, actuator mechanism 124 may move slide port 144, slide 116, and/or at least an optical system 120 in real time. For example, user input of a parameter set may cause a substantially immediate movement of items by actuator mechanism 124.

Still referring to FIG. 1, in some embodiments, apparatus 100 captures a second image of slide 116 at second position. In some embodiments, apparatus 100 may capture second image using at least an optical system 120. In some embodiments, second image may include an image of a region of a sample. In some embodiments, second image may include an image of a region of an area captured in first image. For example, second image may include a more zoomed in, higher resolution per unit area, image of a region within first image. This may cause display of second image to allow a user to detect smaller details within the imaged region.

Still referring to FIG. 1, in some embodiments, second image includes a shift in X and Y coordinates relative to first image. For example, second image may partially overlap with first image.

Still referring to FIG. 1, in some embodiments, second image may include a different focus depth than first image. For example, if a region of interest of first image is out of focus, then second image may use an auto focus system and/or a focus depth set in parameter set to capture second image, where second image is in focus at the region of interest. In a non-limiting example, capturing second image may include detecting a height of a sample at a location of interest, and setting a focus height of the at least an optical system 120 based on the sample height at the region of interest.

Still referring to FIG. 1, in some embodiments, apparatus 100 may capture second image in real time. For example, user may manipulate input interface 128, creating parameter set, then actuator mechanism 124 may cause movement of slide 116 relative to optical system 120 to start substantially immediately after the input interface 128 was manipulated, then optical system 120 may capture second image substantially immediately after actuator mechanism 124 completes its movement. Real-time actuator mechanism 124 movement and image capture may allow user to choose a specific region of interest and receive high resolution image of that region in real time, without having to wait for detailed images of the entire slide 116 to be captured. In some embodiments, artifacts may also be removed in real time. In some embodiments, image may also be annotated in real time. In a non-limiting example, a user may use a mouse cursor to hover over a position in first image and may scroll the mouse wheel indicating that user wishes to zoom in on that location. In this example, X coordinate and Y coordinate of parameter set may be determined based on position of the cursor, and level of zoom of parameter set may be determined based on the amount that the user scrolled the mouse wheel. In this example, apparatus 100 may capture second image based on that parameter set and may apply processes described herein to remove artifacts from second image and annotate second image. In this example, second image may then be displayed to user. While such a process may be performed quickly, instant feedback may be displayed to user as second image is being captured and modified. In a non-limiting example, a zoomed in version of first image may be displayed while second image is being captured, and a non-modified version of second image may be displayed while second image is being modified.

Still referring to FIG. 1, this process may be useful, for example, if a user is looking at an image of slide 116, finds a region of interest and wishes to zoom in on that region more than the resolution of the image would normally allow. Using this process, the user may adjust parameter set to zoom in and apparatus 100 may capture a higher resolution image, remove artifacts and display the image. This may be preferable over manually repeating a process of loading slide 116, setting parameters (to a higher resolution and/or zoom), and waiting for a device to generate and clean up an image.

Still referring to FIG. 1, in some embodiments, apparatus 100 displays second image to user. In some embodiments, second image may be displayed to user using output device 132. Second image may be displayed as described above with respect to output device and display of first image. In some embodiments, displaying the second image to the user may include replacing a region of first image with second image to create a hybrid image; and displaying the hybrid image to the user. As used herein, a "hybrid image" is an image constructed by combining a first image with a second image. In some embodiments, creation of a hybrid image in this way may preserve second image. For example, if second image covers a smaller area at a higher resolution per unit area than first image, then second image may replace a lower resolution per unit area segment of first area corresponding to the region covered by second image. In some embodiments, image adjustments may be made to offset visual differences between first image and second image at a border of first image and second image in hybrid image. In a non-limiting example, color may be adjusted such that background color of the images is consistent along the border of the images. As another non-limiting example, brightness of the images may be adjusted such that there is no stark difference between brightness of the images. In some embodiments, artifacts may be removed from second image and/or hybrid image as described above. In some embodiments, second image may be displayed to user in real time. For example, adjustments (such as annotations and/or artifact removal may be started substantially immediately after second image is captured, and an adjusted version of second image may be displayed to user substantially immediately after adjustments are done. In some embodiments, an unadjusted version of second image may be displayed to user while adjustments are being made. In some embodiments, where there are a plurality of images covering a specific region, when user zooms out using user interface 136, a lower resolution image of the region may be displayed.

Still referring to FIG. 1, in some embodiments, apparatus 100 may transmit first image, second image, hybrid image, and/or a data structure including a plurality of images to an external device. Such an external device may include, in non-limiting examples, a phone, tablet, or computer. In some embodiments, such a transmission may configure the external device to display an image.

Still referring to FIG. 1, in some embodiments, apparatus 100 may annotate an image. In some embodiments, apparatus 100 may annotate first image. In some embodiments, apparatus 100 may annotate second image. In some embodiments, apparatus 100 may annotate hybrid image. For example, upon creation of hybrid image, apparatus 100 may recognize a cell depicted in hybrid image as a cell of a particular type and may annotate hybrid image indicating the cell type. In some embodiments, apparatus 100 may annotate an image selected from the list consisting of first image, second image and hybrid image.

Still referring to FIG. 1, in some embodiments, annotations may be made as a function of user input of an annotation instruction into input interface 128. As used herein, an "annotation instruction" is a datum generated based on user input indicating whether to create an annotation or describing an annotation to be made. For example, user may select an option controlling whether apparatus 100 annotates images. In another example, user may manually annotate an image. In some embodiments, annotations may be made automatically. In some embodiments, annotations may be made using an annotation machine learning model. In some embodiments, annotation machine learning model may include an optical character recognition model, as described above. In some embodiments, annotation machine learning model may be trained using a dataset including image data, associated with text depicted by the image. In some embodiments, annotation machine learning model may accept as an input image data and may output annotated image data and/or annotations to apply to the image data. In some embodiments, annotation machine learning model may be used to convert text written on slides 116 to annotations on images. In some embodiments, annotation machine learning model may include a machine vision model, as described above. In some embodiments, annotation machine learning model including a machine vision model may be trained on a data set including image data, associated with annotations indicating features of the image data. In some embodiments, annotation machine learning model may accept as an input image data and may output annotated image data and/or annotations to apply to image data. Non-limiting examples of features annotation machine learning model may be trained to recognize include cell types, features of cells, and objects in a slide 116 such as bubbles. In some embodiments, images may be annotated in real time. For example, annotation may start substantially immediately after an image is captured and/or a command to annotate an image is received, and annotated image may be displayed to user substantially immediately after annotation is completed.

Still referring to FIG. 1, in some embodiments, apparatus 100 may determine a visual element data structure. In some embodiments, apparatus 100 may display to a user a visual element as a function of visual element data structure. As used herein, a "visual element data structure" is a data structure describing a visual element. As non-limiting examples, visual elements may include first image, second image, hybrid image, and elements of a GUI.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of first image, second image, and/or hybrid image. In some embodiments, a visual element data structure may be determined as a function of an item from the list consisting of first image, second image, hybrid image, a GUI element, and an annotation. In a non-limiting example, a visual element data structure may be generated such that visual element describing or a feature of first image, such as an annotation, is displayed to a user.

Still referring to FIG. 1, in some embodiments, visual element may include one or more elements of text, images, shapes, charts, particle effects, interactable features, and the like. As a non-limiting example, a visual element may include a touch screen button for setting zoom level.

Still referring to FIG. 1, a visual element data structure may include rules governing if or when visual element is displayed. In a non-limiting example, a visual element data structure may include a rule causing a visual element including an annotation describing first image, second image, and/or hybrid image to be displayed when a user selects a specific region of first image, second image, and/or hybrid image using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously. For example, a plurality of annotations may be displayed simultaneously.

Still referring to FIG. 1, in some embodiments, apparatus 100 may transmit visual element to a display such as a display include in output interface 132. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device.

In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an annotation data structure may include a string value representing text of the annotation. In some embodiments, data in a data structure may be organized in a linked list, tree, array, matrix, tenser, and the like. In a non-limiting example, annotation data structures may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, an image data structure may be read and displayed to user. In another non-limiting example, an image data structure may be modified to remove an artifact, as described above.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Figure 2:
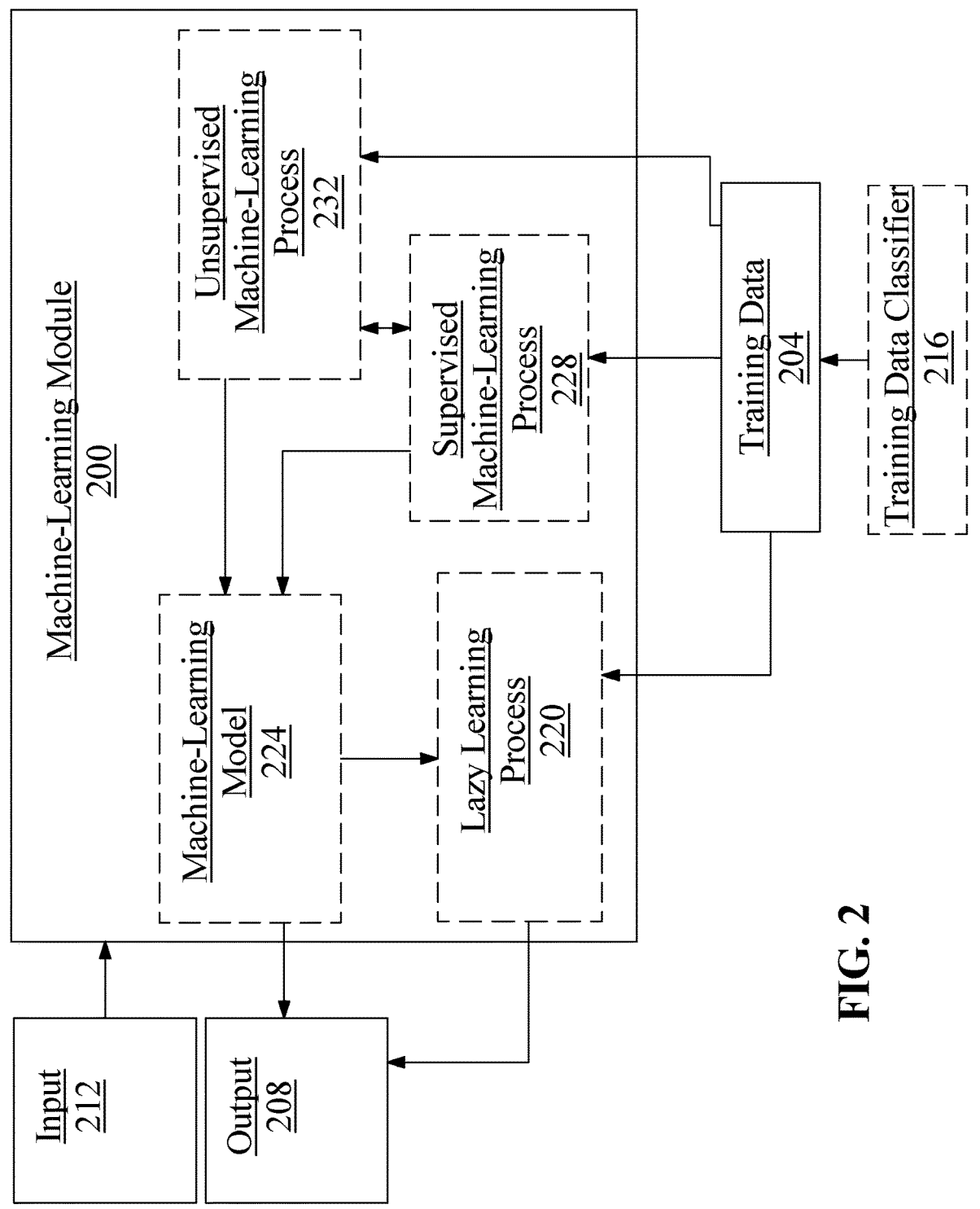
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatically uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include image data and outputs may include annotations.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to characters or numbers as in an optical character recognition model.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include image data as described above as inputs, image data with artifacts removed as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 2, machine learning process may include a generative machine learning process.

As used in this disclosure, a "generative machine learning process" is a process that automatedly, using a prompt (i.e., input), generates an output consistent with training data; this is in contrast to a non-machine learning software program where outputs are determined in advance by a user and written in a programming language. Usually generative machine learning processes determine patterns and structures from training data and use these patterns and structures to synthesize new data with similar characteristics, as a function of an input.

With continued reference to FIG. 2, generative machine learning processes may synthesize data of different types or domains, including without limitation text, code, images, molecules, audio (e.g., music), video, and robot actions (e.g., electromechanical system actions). Exemplary generative machine learning systems trained on words or word tokens, operant in text domain, include GPT-3, LaMDA, LLaMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video include without limitation RunwayML and Make-A-Video by Meta Platforms. Finally, exemplary generative machine learning processes trained using robotic action data include without limitation UniPi from Google Research.

With continued reference to FIG. 2, in some cases a generative machine learning process may include a generative adversarial network. As used in this disclosure, a "generative adversarial network (GAN)" is a machine learning process that includes at least two adverse networks configured to synthesize data according to prescribed rules (e.g., rules of a game). In some cases, a generative adversarial network may include a generative and a discriminative network. An exemplary GAN may be described according to a following game: Each probability space ($\Omega$, $\mu_{ref}$) defines a GAN game. There are two adverse networks: a generator network and a discriminator network. Generator network strategy set is P($\Omega$), the set of all probability measures $\mu_G$ on $\Omega$. Discriminator network strategy set is the set of Markov kernels $\mu_D$: $\Omega \rightarrow P[0,1]$, where P[0, 1] is set of probability measures on [0,1]. GAN game may be a zero-sum game, with objective function $$L(\mu_G, \mu_D) := \mathbb{E}_{x \sim \mu_{ref}, y \sim \mu_D(x)}[\ln y] + \mathbb{E}_{x \sim \mu_G, y \sim \mu_D(x)}[\ln(1 - y)]$$

Generally, generator network may aim to minimize objective, and discriminator network may aim to maximize the objective. Specifically, generator network seeks to approach $\mu_G \approx \mu_{ref}$, said another way, generator network produces data that matches its own output distribution as closely as possible to a reference distribution (provided with training data). Discriminator network outputs a value close to 1 when the data appears to be from reference (training data) distribution, and to output a value close to 0 when the data looks like it came from generator network distribution. Generally speaking, generative network generates data while discriminative network evaluates them, with contest operating in terms of data distributions. In some embodiments, generator network may learn to map from a latent space to a data distribution of interest, while discriminator network may distinguish data produced by the generator network from a true data distribution (e.g., training data). In some cases, generator network's training objective is to increase an error rate of discriminator network (i.e., "fool" the discriminator network by producing novel data that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, data synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

Still referring to FIG. 2, in some embodiments generative machine learning process may include a generative adversarial network (GAN), such as, without limitation, Cycle-GAN. CycleGAN may use a pair of inter-reliant neural network generators relying on the outputs of each other to be used as inputs. A CycleGAN process enables a forward and backward translation between domains to occur simultaneously. CycleGAN processes may include a set of calculations. CycleGAN may differ from paired training data, wherein paired training data consists of training examples $\{x_i, y_i\}_{i=1}^N$, where the correspondence between $x_i$ and $y_i$ already exists. In unpaired training data, as applied to CycleGAN processes, a source set $\{x_i\}_{i=1}^N$ ($x_i \in X$) and a target set $\{y_j\}_{j=1}^M$ ($y_j \in Y$), with no information provided as to which $x_i$ matches which $y_j$. In the case of unpaired data, starting with a first dataset in domain X and a second dataset in domain Y, a general mapping may be enabled such that G:X$\rightarrow$Y, wherein the output $\hat{y}$=G(x), $x \in X$ and is indistinguishable from dataset $y \in Y$ by an adversary trained to classify y apart from y. CycleGAN processes may include a translator operating in a reverse direction from a separate translator which should produce exactly inverse results such that G:X$\rightarrow$Y and F:Y$\rightarrow$X, then G and F should be inverses of each other. $D_x$ operates as a distinguisher between datasets $\{x\}$ and translated datasets $\{F(y)\}$. Conversely $D_y$ operates as a discriminator between $\{y\}$ and $\{G(x)\}$. Next adversarial loss is applied to both mapping functions such that:

$$\mathcal{L}_{GAN}(G, D_Y, X, Y) = \mathbb{E}_{y \sim p_{data}(y)}[\log D_y(y)] + \mathbb{E}_{x \sim p_{data}(x)}[\log(1 - D_y(G(x))]$$

This process is repeatable in a reverse direction and incentivized by reducing cycle consistency loss such that:

$$f_{cyc}(G, F) = \mathbb{E}_{x \sim p_{data}(x)}[\|F(G(x)) - x\|_1] + \mathbb{E}_{y \sim p_{data}(y)}[\|G(F(y)) - y\|_1].$$

The end result is summarized by:

$$f(G, F, D_X, D_Y) = f_{GAN}(G, D_Y, X, Y) + f_{GAN}(F, D_X, Y, X) + \lambda f_{cyc}(G, F).$$

where $\lambda$ controls the relative importance of the objectives.

Still referring to FIG. 2, in a separate non-limiting embodiment, generative machine learning model may include diffusion process and/or diffusion model. An exemplary diffusion model may include an energy-guided stochastic differential equation (EGSDE) process. EGSDE relies on a score-based diffusion model to translate data from one domain to another. Contrary to the CycleGAN process explained above, EGSDE's use score-based diffusion models (SBDMs) to perturb an initial dataset to a Gaussian noise then reverse the process to transform the noise back to the data distribution. This diffusion model adopts a pretrained energy function based on data from the initial source domain and data from the final target domain to guide the inference process of a pretrained stochastic differential equation (SDE). As used herein, "energy function" is defined as a formulaic approximation of a transfer function to convert data from a first dataset from a source domain to usable data within a target domain (e.g., domain of a second dataset). Energy function is composed of two terms. First guiding term is a realistic expert, which prioritizes energy function's focus on discarding source domain-specific features. Second guiding term is a faithful expert, which prioritizes energy function's focus on preserving domain-independent features. Combination of these two functions results in a target domain data set agnostic of source domain data protocols, but which retains substantive features the data manifested. In combination with the pretrained energy function, EGSDE methods employ three experts (energy function, realistic expert, faithful expert) to all contribute to generating best fit output data. A mathematical explanation of this process is described in detail for time-series data. Let $q(y_0)$ be the unknown data distribution on $\mathbb{R}^D$. The forward diffusion process $\{y_t\}_{t \in [0,T]}$, indexed by time t, can then be represented by the following forward SDE:

$$dy = f(y, t)dt + g(t)dw,$$

where $w \in \mathbb{R}^D$ may be a standard Wiener process, $f(\cdot, t)$: $\mathbb{R}^D \rightarrow \mathbb{R}^D$ is the drift coefficient and $g(t) \in \mathbb{R}$ is the diffusion coefficient. As used herein, a "Wiener process" is a filter used in signal processing such that an estimate of a target domain may be produced using linear time-invariant filtering of a noisy process, by assuming known stationary signal. This process may replace the use of a Wiener process with an adaptive filter, least mean squared, frequency domain adaptive filter, or any other applicable filter. As used herein, an "adaptive filter" is a system with a linear filter having a transfer function controlled by variable parameters and a means to adjust those parameters according to an optimization algorithm. The $f(y,t)$ and $g(t)$ is related into the noise size and determines the perturbation kernel $q_{t|0}(y_t|y_0)$ from time 0 to t. If we allow $q_t(y)$ to be the marginal distribution of the SDE at time t, its time reversal can then be described by a separate SDE:

$$dy = [f(y, t) - g(t)^2 \nabla_y \log q_t(y)]dt + g(t)d\bar{w},$$

where $\bar{w}$ is a reverse-time standard Wiener process, and dt is an infinitesimal negative timestep. Then a score-based model, s(y,t), may be adopted to approximate the unknown $\nabla_y \log q_t(y)$ by score matching, and thereby inducing a SBDM, which is defined by an SDE:

$$dy = [f(y, t) - g(t)^2 s(y, t)]dt + g(t)d\bar{w}.$$

This may then be discretized using a Euler-Maruyama solver. By formally adopting a step size of h, the iteration rule from s to t=s−h is:

$$y_t = y_s - [f(y_s, s) - g(s)^2 s(y_s, s)]h + g(s)\sqrt{h}z, \quad z \sim N(0, I).$$

Still referring to FIG. 2, and still in reference to the use of EGSDE, a set of unpaired images from the source domain $\chi \subset \mathbb{R}^D$ and the target domain $\gamma \subset \mathbb{R}^D$ as the training data, the goal is to transfer the original time series data from the source domain to the target domain. This goal is accomplished by designing a distribution $p(y_0|x_0)$ on the target domain Y conditioned on a time series $x_0 \in \chi$ to transfer. The translated time series data should be realistic for the target domain by changing the domain-specific features and faithful for the source time series by preserving the domain-independent features. An iterative latent variable refinement (ILVR) may then use a diffusion model on the target domain for realism. An ILVR starts from $y_T \sim N(0, I)$ and samples from the diffusion model, described immediately above, for $y_T$. To promote faithfulness, $y_T$ may be further refined by adding a residual between the sample y, and the perturbed source image $x_T$ through a non-trainable low-pass filter:

$$y_T \leftarrow y_T + \phi(x_t) - \phi(y_t), \quad x_t \sim q_{t|0}(x_t | x_0),$$

where $\Phi(\cdot)$ is a low-pass filter and $q_{t|0}(\cdot|\cdot)$ is the perturbation kernel determined by the forward SDE. To most accurately employ the pre-trained energy functions across both domains, a valid conditional distribution $p(y_0|x_0)$ is defined by compositing a pretrained SDE and a pretrained energy function under mild regularity conditions as follows:

$$dy = [f(y, t) - g(t)^2(s(y, t) - \nabla_y \varepsilon(y, x_0, t))]dt + g(t)d\bar{w},$$

where $\bar{w}$ is a reverse-time standard Wiener process, dt is an infinitesimal negative timestep such that $s(\cdot|\cdot)$: $\mathbb{R}^D \times \mathbb{R} \rightarrow \mathbb{R}^D$ is the score-based model in the pretrained SDE and $\varepsilon(\cdot,\cdot,\cdot)$: $\mathbb{R}^D \times \mathbb{R}^D \times \mathbb{R} \rightarrow \mathbb{R}$ is the energy function. From there, a start point, $y_m$, is sampled from the perturbation distribution $q_{M|0}(y_M|x_0)$, where user may set M=0.5 T. Transferred time series data is obtained by taking samples at endpoint t=0 following the SDE.

Still referring to FIG. 2, and still in reference to the use of EGSDE, the energy function is derived by balancing the need to retain domain-independent features of initial time series data 108, while appropriately altering the domain-specific features. Based on this balance, the energy function is the sum of two log potential functions:

$$\varepsilon(y, x, t) =$$
$$\lambda_s \varepsilon_s(y, x, t) + \lambda_i \varepsilon_i(y, x, t) = \lambda_s \mathbb{E}_{q_{t|0}(x_t|x)} S_S(y, x_t, t) - \lambda_i \mathbb{E}_{q_{t|0}(x_t|x)} S_i(y, x_t, t),$$

where $\varepsilon_i(\cdot,\cdot,\cdot)$: $\mathbb{R}^D \times \mathbb{R}^D \times \mathbb{R} \to \mathbb{R}^C$ and $\varepsilon_s(\cdot,\cdot,\cdot)$: $\mathbb{R}^D \times \mathbb{R}^D \times \mathbb{R}^D \times \mathbb{R} \to \mathbb{R}$ are the log potential functions, $x_t$ is the perturbed source image in the forward SDE, $q_{t|0}(\cdot|\cdot)$ is the perturbation kernel from time 0 to time t in the forward SDE, $S_S(\cdot,\cdot,\cdot)$: $\mathbb{R}^D \times \mathbb{R}^D \times \mathbb{R} \to \mathbb{R}$ and $S_i(\cdot,\cdot,\cdot)$: $\mathbb{R}^D \times \mathbb{R}^D \times \mathbb{R} \to \mathbb{R}$ are functions measuring similarity between the source time series and the perturbed time series, and $\lambda_s \in \mathbb{R}^D_{>0}$, are weighting hyper-parameters. To specify $S_S(\cdot,\cdot,\cdot)$, a time-dependent domain-specific feature extractor $E_s(\cdot,\cdot)$: $\mathbb{R}^D \times \mathbb{R} \to \mathbb{R}^{C \times H \times W}$, where C, H, and W are specific feature descriptors of the output. $E_s(\cdot,\cdot)$ is the all but last layer of a classifier trained on both domains to predict whether a time series is from the source domain or the target domain. $S_S(\cdot,\cdot,\cdot)$ is defined as the cosine similarity between features extracted from generated example 116 and initial time series data 108 as follows:

$$S_S(y, x_t, t) = \frac{1}{HW} \sum_{h,w} \frac{E_s^{hw}(x_t, t)^T E_s^{hw}(y, t)}{\left\| E_s^{hw}(x_t, t) \right\|_2 \left\| E_s^{hw}(y, t) \right\|_2},$$

where $E_s^{hw}(\cdot,\cdot) \in \mathbb{R}^C$ denotes specific source features. $S_i(\cdot,\cdot,\cdot)$ is specified by introducing a domain-independent feature extractor, $E_i(\cdot,\cdot)$: $\mathbb{R}^D \times \mathbb{R} \to \mathbb{R}^D$, which operates as a low-pass filter preserving domain-independent features and discarding domain-specific features. $S_i(\cdot,\cdot,\cdot)$ is further defined as the negative squared $L_2$ distance between features extracted from generated example 116 and initial time series data 108 as follows:

$$S_i(y, x_t, t) = -\|E_i(y, t) - E_i(x_t, t)\|_2^2.$$

A more sophisticated $E_i$, beyond simply operating as a low-pass filter, may be employed to disentangle learning methods of the separate domains.

Still referring to FIG. 2, and still in reference to the use of EGSDE, solving the energy-guided reverse-time SDE may be accomplished using the pretrained score-based model s(y,t) and energy function, $\varepsilon(y,x,t)$, to create generated example 116 from conditional distribution $p(y_0|x_0)$. A fair comparison may be achieved using numerical solvers to approximate trajectories from SDEs. As a non-limiting embodiment, a Euler-Maruyama solver is used herein adopting a step size, h, where the iteration rule from s to t=s−h is:

$$y_t = y_s - \left[f(y, s) - g(s)^2(s(y_s, s) - \Delta_y \varepsilon(y_s, x_0, s))\right]h + g(s)\sqrt{h}\,z,$$

$$z \sim \mathcal{N}(0,\mathrm{I}).$$

The Monte Carlo method is used to estimate the expectation of a single sample for efficiency. In a non-limiting embodiment, the variance preserve energy-guided SDE may be used to modify the noise prediction network and take it into the sampling procedure in denoising diffusion probabilistic models.

Still referring to FIG. 2, and still in reference to the use of EGSDE, a product of experts is used for the discretized sampling process. A conditional distribution at time, t, is defined:

$$\tilde{p}(y_t|x_0) = \frac{p_{r1}(y_t|x_0)p_e(y_t|x_0)}{Z_t},$$

where $Z_t$ is the partition function, $p_e(y_t|x_0) \propto \exp(-\varepsilon(y_t|x_0, t))$ and $p_{r1}(y_t|x_0)$ is the marginal distribution at time t, based on a pretrained SDE on the target domain. A transition kernel, $\tilde{p}(y_t|y_s)$, is constructed based on the desirable equilibrium, $\tilde{p}(y_t|x_0)=\int \tilde{p}(y_t|y_s)\, \tilde{p}(y_s|x_0)dy_s$, where t=s−h:

$$\tilde{p}(y_t|y_s) = \frac{p(y_t|y_s)p_e(y_t|x_0)}{\tilde{Z}_t(y_s)},$$

where $\tilde{Z}_t(y_s)$ is the partition function and $p(y_t|y_s)= \mathcal{N}(\mu(y_s, h), \Sigma(s,h)I)$ is the transition kernel of the pretrained SDE. Using a Taylor expansion around $\mu(y_s, h)$ to approximate low curvature values of $\varepsilon(y_t, x_0, t)$, the following is obtained:

$$\tilde{p}(y_t | y_s) \approx \mathcal{N}\Big(\mu(y_s, h) - \sum(s, h)\, \nabla'_y \varepsilon(y', x_0, t)\big|_{y=\mu(y_0,h)}, \sum(s, h)I\Big).$$

Solving the energy-guided SDE in a discretization manner is approximated by sampling from a product of experts as described at the beginning of this paragraph. The conditional distribution, initially defined in the beginning of this paragraph, can now be rewritten as:

$$\tilde{p}(y_t | x_0) = \frac{p_{r1}(y_t|x_0)p_{r2}(y_t|x_0)p_f(y_t|x_0)}{Z_t},$$

where $p_{r2}(y_t|x_0) \propto \exp(-\lambda_s \varepsilon_s(y_t, x_0, t)$, $p_f(y_t|x_0) \propto \exp(-\lambda_i(y_t, x_0, t)$. With t=0, transferred samples approximately follow the distribution defined by the product of three experts, where $p_{r1}(y_t|x_0)$ and $p_{r2}(y_t|x_0)$ operate as the realism experts and $p_{r2}(y_t|x_0)$ is the faithful expert, corresponding to the score function s(y,t) and the log potential functions $\varepsilon_s(y,x,t)$ and $\varepsilon_i(y,x,t)$, respectively.

Further referring to FIG. 2, one or more processes or algorithms described above may be performed by at least a dedicated hardware unit 232. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 232 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 232 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 232 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
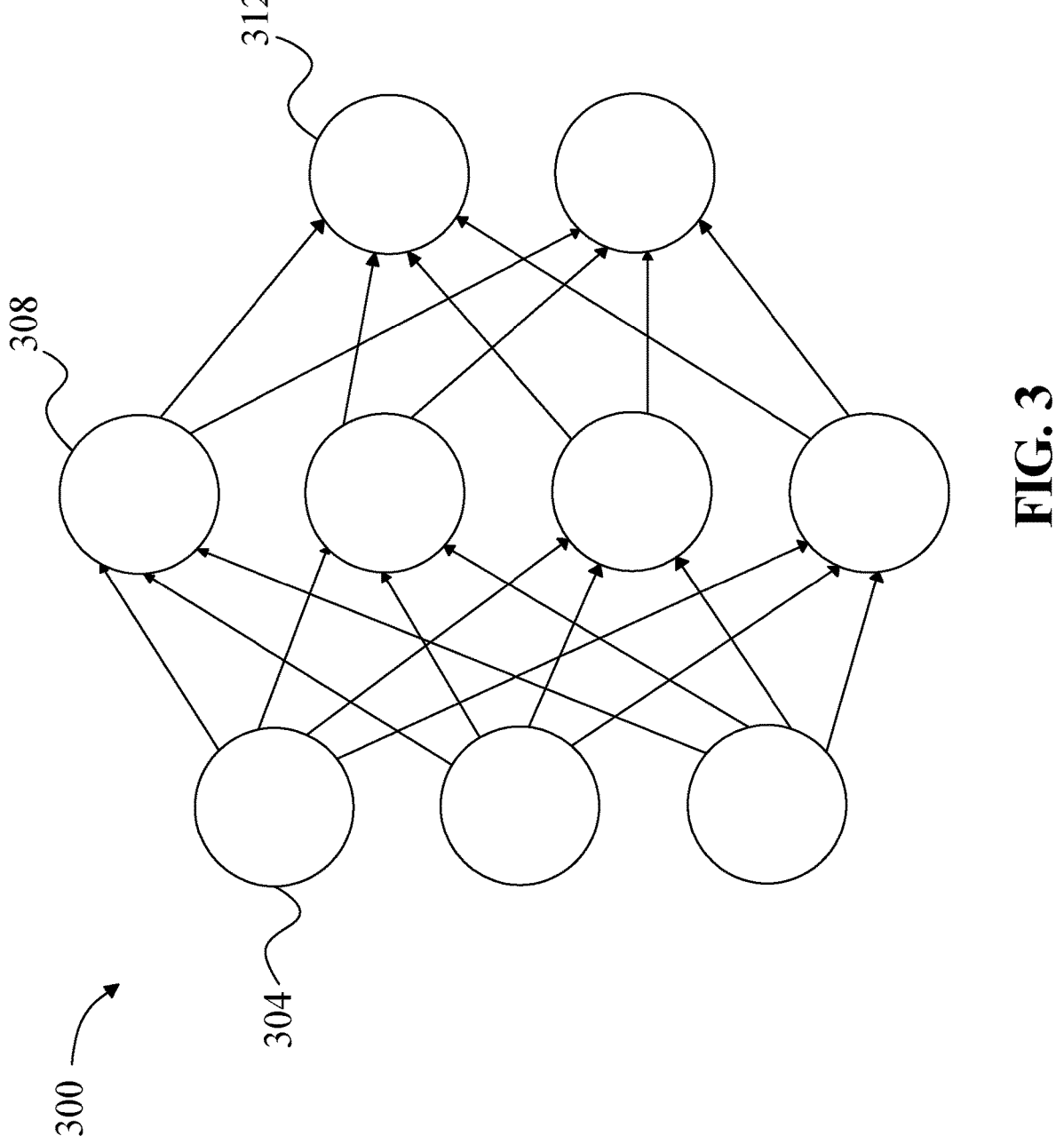
FIG. 3 is a diagram depicting an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
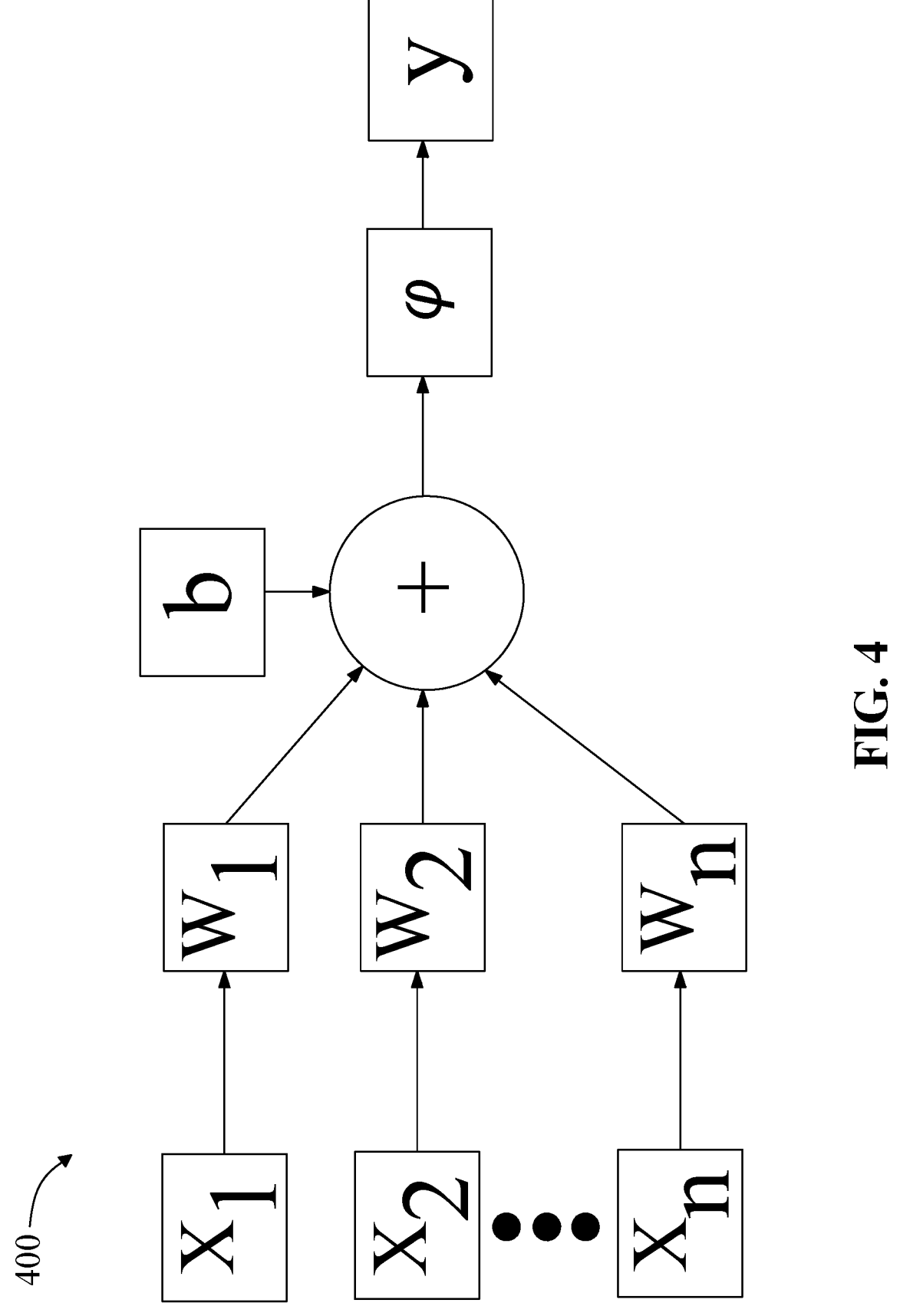
FIG. 4 is a diagram depicting an exemplary neural network node.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tahn (hyperbolic tangent) function, of the form $$\frac{e^x - e^{-x}}{e^x + e^{-x}},$$

a tahn derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 5, an exemplary embodiment of a method 500 of real time image generation is illustrated. One or more steps of method 500 may be implemented, without limitation, as described above in reference to FIG. 1. One or more steps of method 500 may be implemented, without limitation, using at least a processor.

Still referring to FIG. 5, in some embodiments, method 500 may include at least an optical system, capturing a first image of a slide at a first position 505.

Still referring to FIG. 5, in some embodiments, method 500 may include using an output interface, displaying the first image to a user 510.

Still referring to FIG. 5, in some embodiments, method 500 may include using an input interface, receiving a parameter set from a user 515.

Still referring to FIG. 5, in some embodiments, method 500 may include using an actuator mechanism, moving an item selected from the list consisting of a slide port, the slide, and the at least an optical system into a second position, wherein the location of the second position is based on the parameter set 520. In some embodiments, moving the item selected from the list consisting of the slide port, the slide, and the at least an optical system into a second position includes using the actuator mechanism, positioning the slide relative to the at least an optical system such that a region of interest defined by the parameter set is within the frame of the at least an optical system; and setting the zoom of the at least an optical system based on a level of zoom specified by the parameter set. In some embodiments, moving the item selected from the list consisting of the slide port, the slide, and the at least an optical system into a second position further includes setting a focus height of the at least an optical system based on a focus height specified by the parameter set. In some embodiments, moving the item selected from the list consisting of the slide port, the slide, and the at least an optical system into a second position further includes detecting a sample height at the region of interest; and setting a focus height of the at least an optical system based on the sample height at the region of interest.

Still referring to FIG. 5, in some embodiments, method 500 may include using at least an optical system, capturing a second image of the slide at the second position 525. In some embodiments, the second image is captured using a higher level of zoom than that used to capture the first image.

Still referring to FIG. 5, in some embodiments, method 500 may include using the output interface, displaying the second image to the user 530. In some embodiments, displaying the second image to the user includes replacing a region of the first image with the second image to create a hybrid image; and displaying the hybrid image to the user.

Still referring to FIG. 5, in some embodiments, method 500 may further include using user interface, receiving an annotation instruction from the user; and adding an annotation to an image selected from the list consisting of the first image, the second image, and the hybrid image based on the annotation instruction.

Still referring to FIG. 5, in some embodiments, method 500 may further include using and an annotation machine learning model, identifying an image feature; and adding an annotation to an image selected from the list consisting of the first image, the second image, and the hybrid image based on the identification of the image feature.

Still referring to FIG. 5, in some embodiments, method 500 may further include removing a first artifact from the first image by inputting the first image into an artifact removal machine learning model; and receiving from the artifact removal machine learning model a version of first image lacking the artifact.

Still referring to FIG. 5, in some embodiments, method 500 may further include removing a second artifact from the second image by: inputting the second image into an artifact removal machine learning model; and receiving from the artifact removal machine learning model a version of second image lacking the artifact.

One or more features of apparatus 100 may be consistent with a feature disclosed in one or more of (A) U.S. patent application Ser. No. 18/217,378, filed on Jul. 25, 2023, and titled "APPARATUS AND A METHOD FOR DETECTING ASSOCIATIONS AMONG DATASETS OF DIFFERENT TYPES," the entirety of which is hereby incorporated by reference; (B) U.S. patent application Ser. No. 18/226,017, filed on Jul. 25, 2023, and titled "APPARATUS AND A METHOD FOR GENERATING A CONFIDENCE SCORE ASSOCIATED WITH A SCANNED LABEL," the entirety of which is hereby incorporated by reference; and (C) U.S. patent application Ser. No. 18/226,058, filed on Jul. 25, 2023 and titled "IMAGING DEVICE IMAGING DEVICE AND A METHOD FOR IMAGE GENERATION OF A SPECIMEN," the entirety of which is hereby incorporated by reference.

Figure 6:
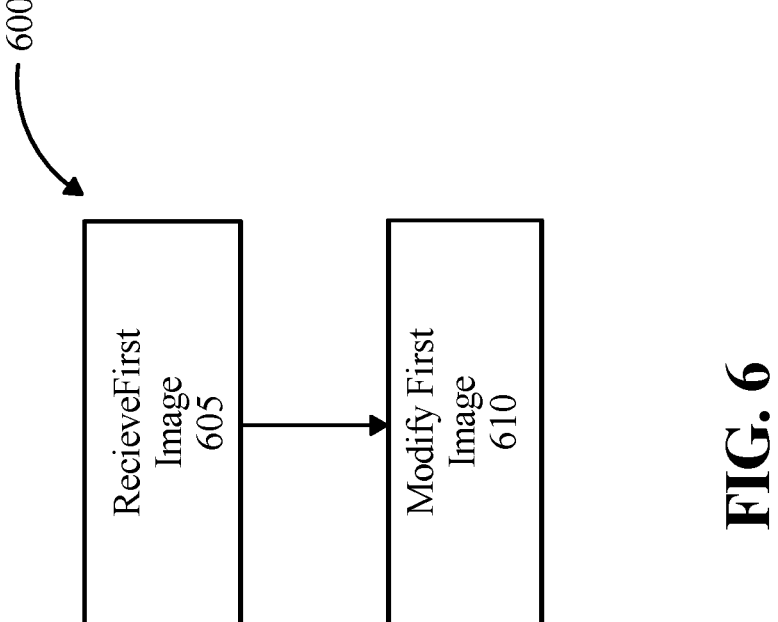
FIG. 6 is another exemplary method of real-time image generation.
Figure 7:
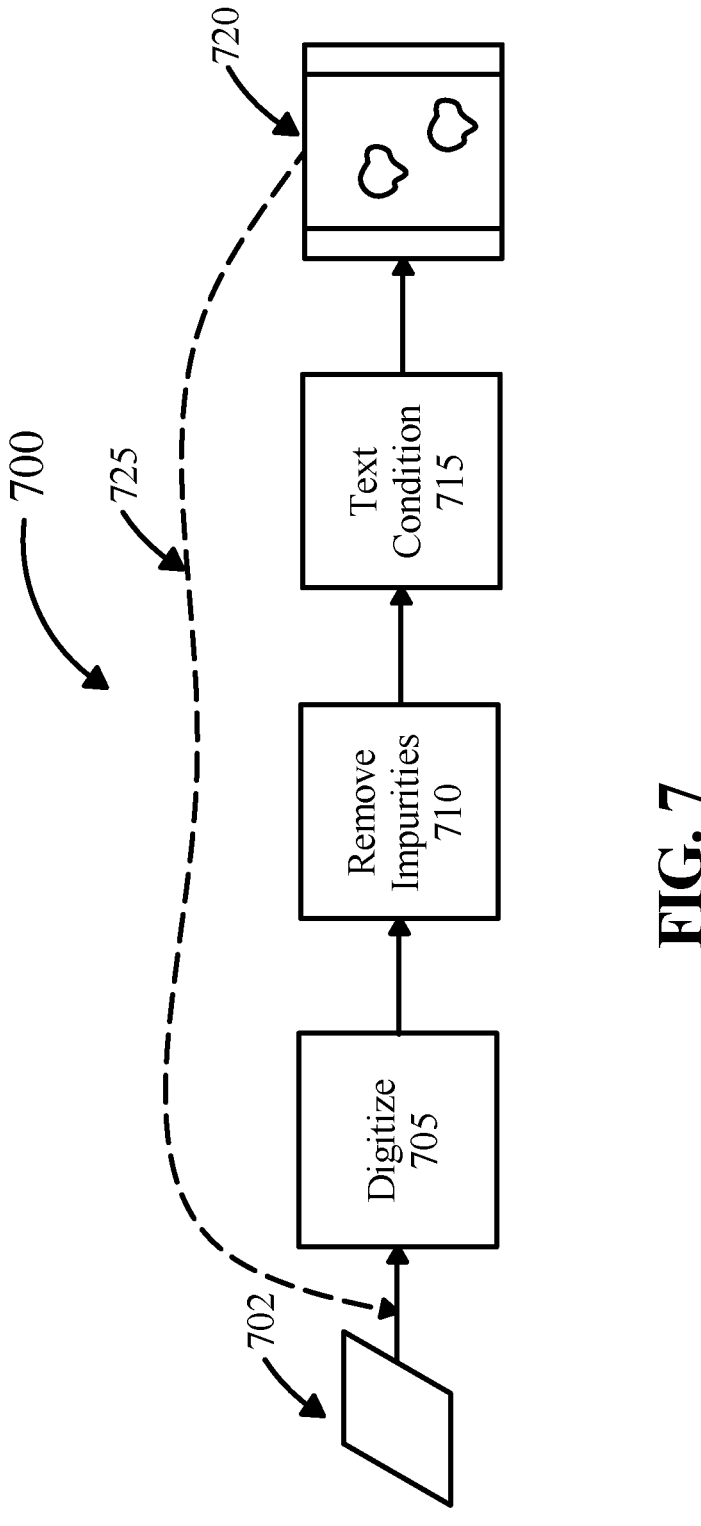
FIG. 7 is yet another exemplary method of real-time image generation.

Referring now to FIGS. 6-7, exemplary methods are described. In some cases, intraoperative diagnostic assessment of tissue may be of immense value. In some cases, fixing a tissue sample may be performed using one or more of formalin, paraffin, and cryogenic methods. According to some methods, digitizing, modifying, and displaying an image of a slide mounted tissue sample may be performed at rates suitable for intraoperative analysis. For instance, a tissue sample may be biopsied, frozen, sectioned, and mounted on a slide, and then a process may be employed to digitize images of the slide, modify them according to one or methods described in this disclosure and display them to a user, all during an operation.

FIG. 6 illustrates an exemplary method 600 of modifying an image. In some embodiments, digitization of an image of tissue may result in generation of high-quality images which are immediately received by a processor. Digitization may include any method described in this disclosure, including those using one or more of an optical system and/or an optical sensor. At step 605 method may receive image, for instance using one or more of a computing device and/or processor as described in this disclosure. Image may include a digital image, and receiving image may include receiving a digital signal of image. Receiving image 605 may be performed remote or local to digitization hardware (e.g., optical system and/or optical sensor) or remote to digitization hardware, for instance through cloud transfer and/or network communication.

With continued reference to FIG. 6, at step 610, method 600 may modify image. In some case, image modification may include one or more of removing artifacts, recognizing annotations, classifying images with annotations. Once modified, image may be displayed to a user. In some cases of method 600, section (e.g., a frozen section of tissue) may be directly viewed by a pathologist with artifacts removed, and with pathological features detected in segments of the digitized slide, thereby enabling interactive viewing and digitizing of the section.

Referring now to FIG. 7, an exemplary method 700 of real-time image generation is shown. Method 700 may facilitate rapid real-time digitization of a slide with selective high-resolution scans of select regions of the slide with potential pathological features and impurities. In some cases, a tissue section 702 (e.g., frozen tissue section) may be digitized, at step 705. For instance, in some cases, digitization 705 may occur according to a scanning process. Digitization and/or scanning processes may include any digitization or scanning process described in this disclosure, including those incorporated by reference in this disclosure.

With continued reference to FIG. 7, at step 710, digitized image may be modified to remove impurities. Removal of impurities may be performed according to any image modification/generation process described in this disclosure. In some cases, step 710 may remove artifacts from digital image. In some cases, any machine learning model and/or process described above may be employed for artifact removal. For instance in some cases a diffusion model may be used for image modification, such as removing impurities where the image generation is performed unconditionally or conditionally given detected regions of impurities.

With continued reference to FIG. 7, step 715 may include modification of digital image conditioned on user input, such as permitting user examination of specific layers at different magnifications, through an interface that emulates traditional microscope controls. In some cases, user input may include audio and/or text input. For instance, text-conditioned (i.e., audio translated to text) examination of select regions of slide may be performed at step 710 through a user interface. User interface may include any user interface described in this disclosure. In some cases, user interface may include one or more of microscope controls, a touch/keyboard, and microphone interface.

In some cases, a system (as described throughout this disclosure) coupled with user interface enables user to interactively 725 view modified digital image of slide 720 at different magnification levels as well as high-resolution scans of specific sections. In some cases, at step 725, digitization of new images may follow modification of digitized images. New digitized images may then be modified and combined with earlier images all in real-time, thereby eliminating multiple iterations that could prove costly from a time perspective for intraoperative decision making. Machine learning models as described above may be used to combine images, for instance segmentation models. Additionally, in some cases, interaction with digitized slide image with text input or region demarcation may be performed with text-conditioned diffusion models. In some versions, both from training and inference time perspective diffusion models may be trained on a latent space of quantized vectors where the quantization is performed by a separate Vector Quantized Generative Adversarial Network (VQGAN) model, or the like.

In some cases, after image modification 610, image may be displayed using an output device. For instance, image be viewed interactively and verified by a human expert; in some cases, this may occur on the very same device that digitized slide.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
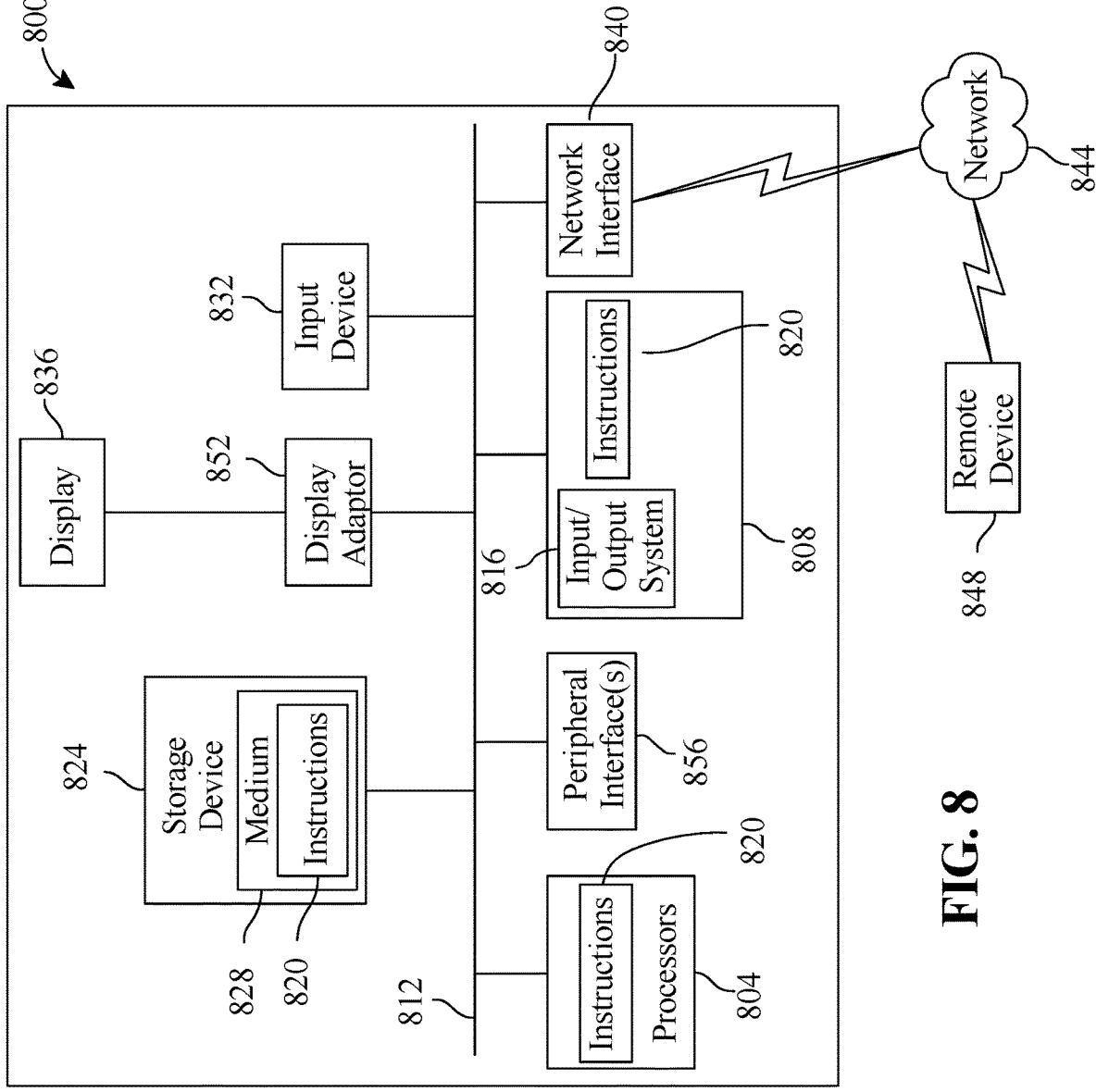
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for real time image generation, the apparatus comprising:

at least an optical system;

a slide port configured to hold a slide;

an actuator mechanism mechanically connected to a mobile element;

a user interface; and at least a processor; and a memory communicatively connected to the at least a processor, the memory containing instructions configuring the at least a processor to:

using the at least an optical system, capture a first image of the slide at a first position;

receive a first parameter set;

using the actuator mechanism, move the mobile element into a second position, wherein the second position is determined based on the first parameter set;

using the at least an optical system, capture a second image of the slide at the second position; and using the user interface, display the second image to a user.

2. The apparatus of claim 1, wherein the first image comprises an image of the entire slide.

3. The apparatus of claim 1, wherein the second image comprises a plurality of images of an region of interest of the slide at differing focus depths for each image of the plurality of images.

4. The apparatus of claim 1, wherein the memory contains further instructions configuring the at least a processor to add an annotation to the second image based as a function of an annotation instruction.

5. The apparatus of claim 1, wherein the memory contains further instructions configuring the at least a processor to identify at least an artifact within the first image using a machine vision system.

6. The apparatus of claim 5, wherein the memory contains further instructions configuring the at least a processor to remove the at least an artifact from the first image.

7. The apparatus of claim 1, wherein the memory contains further instructions configuring the at least a processor to identify a second parameter set as a function of the first parameter set, wherein the second parameter set comprises a level of zoom associated with a region of interest of the slide.

8. The apparatus of claim 1, wherein the memory contains further instructions configuring the at least a processor to modify the second image, wherein modifying the second image comprises replacing at least a region of the first image with the second image to create a hybrid image.

9. The apparatus of claim 1, wherein moving the mobile element into the second position comprises setting a focus height of the at least an optical system based on a focus height specified by the first parameter set.

10. The apparatus of claim 1, wherein moving the mobile element into the second position comprises positioning, using the actuator mechanism, the at least an optical system relative to the slide such that a region of interest of the slide defined by the first parameter set is within a frame of the at least an optical sensor of the at least an optical system.

11. A method for real time image generation, the method comprising:

capturing, by at least a processor, a first image of a slide at a first position using at least an optical system;

receiving, by the at least a processor, a first parameter set;

moving, by the at least a processor, a mobile element into a second position, wherein the second position is determined based on the first parameter set using an actuator mechanism;

capturing, by the at least a processor, a second image of the slide at the second position using at least an optical system; and displaying, by the at least a processor, the second image to a user using a user interface.

12. The method of claim 11, wherein the first image comprises an image of the entire slide.

13. The method of claim 11, wherein the second image comprises a plurality of images of an region of interest of the slide at differing focus depths for each image of the plurality of images.

14. The method of claim 11, wherein method further comprises adding, by the at least a processor, an annotation to the second image based as a function of an annotation instruction.

15. The method of claim 11, wherein method further comprises identifying, by the at least a processor, at least an artifact within the first image using a machine vision system.

16. The method of claim 15, wherein method further comprises removing, by the at least a processor, the at least an artifact from the first image.

17. The method of claim 11, wherein method further comprises identifying, by the at least a processor, a second parameter set as a function of the first parameter set, wherein the second parameter set comprises a level of zoom associated with a region of interest within the slide.

18. The method of claim 11, wherein method further comprises modifying, by the at least a processor, the second image, wherein modifying the second image comprises replacing at least a region of the first image with the second image to create a hybrid image.

19. The method of claim 11, wherein moving the mobile element into the second position comprises setting a focus height of the at least an optical system based on a focus height specified by the first parameter set.

20. The method of claim 11, wherein moving the mobile element into the second position comprises positioning, using the actuator mechanism, the at least an optical system relative to the slide such that a region of interest of the slide defined by the first parameter set is within a frame of the at least an optical sensor of the at least an optical system.

* * * * *